US008175775B2

(12) United States Patent
Foster et al.

(10) Patent No.: US 8,175,775 B2
(45) Date of Patent: May 8, 2012

(54) SYSTEM AND METHOD EMPLOYING SHORT RANGE COMMUNICATIONS FOR ESTABLISHING PERFORMANCE PARAMETERS OF AN EXEMPLAR AGRICULTURAL MACHINE AMONG A PLURALITY OF LIKE-PURPOSE AGRICULTURAL MACHINES

(75) Inventors: Christopher A. Foster, Akron, PA (US);
Riccardo Morselli, Spilamberto (IT);
Olivier Arnel Vanhercke, Zedelgem (BE); Guoping Wang, Naperville, IL (US); Bart M. A. Missotten, Herent (BE); Bert Juul Frans Paquet, Bruges (BE); John H. Posselius, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 1001 days.

(21) Appl. No.: 12/157,521

(22) Filed: Jun. 11, 2008

(65) Prior Publication Data

US 2009/0312919 A1 Dec. 17, 2009

(51) Int. Cl.
*G06F 7/70* (2006.01)
*G06F 19/00* (2006.01)
*G06G 7/00* (2006.01)
*G06G 7/76* (2006.01)

(52) U.S. Cl. ........................................................ 701/50
(58) Field of Classification Search ................... 455/466, 455/566, 557, 74, 99, 575, 88, 66, 553, 72, 455/41.2; 700/224; 701/50; 345/156; 601/2; 606/1, 33; 706/54; 703/1
See application file for complete search history.

(56) References Cited

U.S. PATENT DOCUMENTS

| | | | |
|---|---|---|---|
| 5,529,537 A | 6/1996 | Johnson | 460/6 |
| 5,712,782 A | 1/1998 | Weigelt et al. | 364/424.07 |
| 6,154,658 A * | 11/2000 | Caci | 455/466 |
| 6,216,071 B1 | 4/2001 | Motz | 701/50 |
| 7,181,343 B2 | 2/2007 | Mukaiyama | 701/200 |
| 2005/0275626 A1* | 12/2005 | Mueller et al. | 345/156 |
| 2006/0047377 A1 | 3/2006 | Ferguson et al. | 701/2 |
| 2006/0240884 A1 | 10/2006 | Klimmer | 460/119 |

FOREIGN PATENT DOCUMENTS

| | | |
|---|---|---|
| JP | 02242602 | 9/1990 |
| JP | 11289842 | 10/1999 |
| JP | 2002186348 | 7/2002 |
| JP | 2004326169 | 11/2004 |

* cited by examiner

*Primary Examiner* — Christopher J. Novosad
(74) *Attorney, Agent, or Firm* — Patrick M. Sheldrake

(57) ABSTRACT

A system and method for enabling the communication to and establishment among a plurality of generally like and like-purpose agricultural machines designed to perform generally similar agricultural operations within a given area generally like performance parameters, especially based upon the performance parameters of a particular agricultural machine that is considered or deemed to be the expert or exemplar machine, which system and method employ short range communications systems included in or associated with the operating systems of the individual agricultural machines to effect the distribution of the exemplar performance parameters to the plurality of agricultural machines, through a peer-to-peer wireless network between and among the plurality of agricultural machines for point-to-point communications, for use by the individual agricultural machines in controlling and performing the agricultural operation.

25 Claims, 5 Drawing Sheets

SYSTEM AND METHOD EMPLOYING SHORT RANGE COMMUNICATIONS FOR ESTABLISHING PERFORMANCE PARAMETERS OF AN EXEMPLAR AGRICULTURAL MACHINE AMONG A PLURALITY OF LIKE-PURPOSE AGRICULTURAL MACHINES

TECHNICAL FIELD

The present invention is directed to agricultural equipment, including combine harvesters and related equipment, and more particularly to a system, and method of use thereof, for enabling the communication and establishment of generally like performance parameters for and among a plurality of generally like-purpose individual agricultural machines each of which is designed and operable to generally similarly perform a particular agricultural operation in accordance with a set of performance parameters established therefor. More specifically, the present invention is directed to a relatively inexpensive system and method for wirelessly intercommunicating over a short range between and among a plurality of generally like-purpose agricultural machines, such as combine harvesters, located in a field and forming a peer-to-peer network, and for controllably establishing among such plurality of generally like-purpose agricultural machines generally like performance parameters, based upon the performance parameters of an exemplar machine from among the plurality of agricultural machines, to be utilized by the plurality of the agricultural machines in the performance of a particular agricultural operation, such as the harvesting of a crop by the plurality of combine harvesters.

BACKGROUND ART

In the harvesting of crops, agricultural equipment, sometimes denoted herein by the abbreviation AE, and the individual agricultural machines of such agricultural equipment have long been operated under control of an operator thereof, sometimes based upon various data relating, among other things, to the individual machine being operated as well as to crop type, weather conditions, topographical conditions, and the position of the individual machine in the field from which the crop is being harvested. In more recent years, sensors and processing devices and systems of various types have been employed to assist in the control and operation of the individual agricultural machines, and positioning systems of various designs have been developed to permit an accurate indication of the position of the individual machine within a field to be readily determined.

Many combine harvesters, often hereinafter referred to more simply as harvesters, now include or employ associated operating systems to control to some extent the harvesting operations. Such operating systems typically include a processing portion that is operatively connected to receive data input by a user at or through various operator controls or input devices as well as various data inputs from various sensor or monitoring devices or systems. The processing portion is responsive to the data that it receives to develop and establish various performance parameters for the operation of the harvester in the harvesting of a crop and to control the operation of the harvester as it moves through the field and its components operate to harvest the crop. In general, each combine harvester operates to harvest the crop in accordance with the performance parameters established for such combine harvester, which performance parameters typically vary from harvester to harvester often due, at least in part, to different settings called for or adjustments made by individual operators as well as differing sensor detections.

Consequently, when a plurality of combine harvesters are employed to harvest a crop in a field, each of such combine harvesters may be operating with different performance parameters, and some of the harvesters may be operating less efficiently than others of the harvesters, such as because the operator of a given harvester is appreciably less experienced with the operation of that particular harvester construction or less attuned to various nuances of the equipment or less knowledgeable of the applicable field conditions. In such situations, it is desirable that adjustments be able to be made to the performance parameters of the less efficiently operating machine in order to secure more optimized operation of such machine.

In part, to address such concerns, communications systems and devices of various constructions have been installed on or in the individual agricultural machines to allow communications therebetween by the operators thereof and even the communication or exchange of various data, typically by RF wireless communications. Voice communications have allowed the operators of individual agricultural machines, including different types of agricultural machines, to orally communicate information, including machine location and operating information, to the operators of other agricultural machines, thereby allowing the operators to make adjustments in the operations of the individual machines as conditions might warrant, principally, when the communications are between different types of agricultural machines, such as between a combine harvester and a crop transport vehicle, in the navigation of a second agricultural machine to join or intercept a first agricultural machine, such as for the transfer of a harvested crop from the first to the second agricultural machine.

In such regard, in some instances and with some communications systems machine operators of a combine harvester have been able to provide electronic data to other operators or to control systems associated with other agricultural machines, such as crop transport vehicles, to permit coordination of crop transfer to the crop transport vehicles and, in some cases, to remotely exercise some control over crop transport vehicles, such as steerage of the crop transport vehicles to meet the combine harvester at the combine harvester's position in a field, and the scheduling of the time and location for the combine harvester and a crop transport vehicle to meet.

In other instances and with other systems, machine operators of a crop transport vehicle have been able to receive electronic data from combine harvesters to permit control systems associated with the crop transport vehicle to coordinate the scheduling of positionings of the crop transport vehicle relative to one or more crop harvesters and the automated steerage of the crop transport vehicle to meet the combine harvesters at the combine harvesters' positions in a field so that coordinated transfers of the harvested crop from the combine harvesters to the crop transport vehicle can be effected.

For the most part, however, the electronic data so provided or received has related to the location and relative positionings of the combine harvesters and transport vehicles, with, in some instances, an operator of the combine harvester or the crop transport vehicle having the further ability to act as a master and to remotely control to some extent the navigation and/or steerage of others of the agricultural vehicles as slave vehicles in order to effect interceptions therebetween for the transfer of harvested crop from the combine harvesters to the transport vehicles. In other instances, the electronic data may be communicated to a control location distinct from both the combine harvesters and the transport vehicles, and remote operation of the combine harvesters and crop transport vehicles may be effected from such distinct location. In some situations, control systems of slave vehicles have been so designed that, instead of, or in addition to, facilitating the steerage of navigation of the vehicles to effect an intercept therebetween, the slave vehicle is controlled to follow, or to remain at a relatively fixed distance from, the master vehicle, based upon a continuing communication of positioning and location information between or regarding the master and slave vehicles.

Such communications and data exchanges between combine harvesters and crop transport vehicles have not, however, addressed the concerns relative to the use of varying performance parameters by generally like combine harvesters, and the resulting differences in securing optimal harvesting results. Users have continued to seek systems and methods that would allow them to readily establish, especially without the need for extended voice communications by machine operators, and resultant operator actions to manually reset various controls or parameters of the agricultural machines they are operating, within a plurality of generally like agricultural machines designed to perform generally similar agricultural operations within a given area, generally like performance parameters for the plurality of agricultural machines, especially based upon the performance parameters of a particular agricultural machine that is considered or deemed to be the expert or exemplar machine.

SUMMARY OF THE INVENTION

The present invention is thus directed to a system and method for enabling the communication to and establishment among a plurality of generally like and like-purpose agricultural machines designed to perform generally similar agricultural operations within a given area generally like performance parameters, especially based upon the performance parameters of a particular agricultural machine that is considered or deemed to be the expert or exemplar machine. The system and method of the present invention employs short range communications systems included in or associated with the operating systems of the individual agricultural machines to effect the distribution of the exemplar performance parameters to the plurality of agricultural machines, through a peer-to-peer wireless network between and among the plurality of agricultural machines for point-to-point communications, for use by the individual agricultural machines in controlling and performing the agricultural operation.

In accordance with the present invention, each of the individual generally like-purpose agricultural machines from such plurality of generally similar agricultural machines includes an operating system that includes an operator interface portion, a sensor input portion, a master machine control, and an operation performance portion, with the master machine control operatively connected to such other noted portions. The operator interface portion includes operator input controls operable to provide operator input data to the master machine control. The sensor input portion is operable to monitor certain operational conditions and to provide sensor input data to the master machine control. The output performance portion is operable to effect performance of a particular agricultural operation by such individual agricultural machine under control of the master machine control thereof. The master machine control is responsive to data provided thereto from the operator interface portion and the sensor input portion to establish performance parameters for such individual agricultural machine.

In operation, each of the individual agricultural machines is thus operable to establish performance parameters that are specific to such agricultural machine and its operator, which specific performance parameters are deemed or considered to be machine-specific performance parameters, and to independently perform the particular agricultural operation in accordance with the machine-specific performance parameters established therefor. Such machine-specific performance parameters for any given agricultural machine include as at least a subset thereof a set of performance parameters that form or define a base operating set of performance parameters for such agricultural machine.

Each of the individual agricultural machines of such plurality of agricultural machines also has associated therewith a communications control portion operable to transmit and receive short distance communication signals, which communications control portion is operatively connected to the master machine control of the operating system to effect communication therefrom and thereto of communications data. When the plurality of agricultural machines are positioned within a given area, relatively near to one another, to be within range of the short distance communication signals, such so positioned agricultural machines define a peer-to-peer network having a wireless communications bus accessible through the communications control portions of the individual agricultural machines to interconnect such positioned plurality of individual agricultural machines for point-to-point communications.

With the plurality of agricultural machines so positioned in a peer-to-peer network, the operator interface portion of at least one of the agricultural machines is operable to enable the operator thereof to identify a desired agricultural machine from among the plurality of agricultural machines as an exemplar machine and to effect the transmission by the exemplar machine of data representative of the base operating set of performance parameters of such exemplar machine to others of the plurality of agricultural machines. At least one of such others of the plurality of agricultural machines, defined as a target machine, is operable to receive over the wireless communications bus data representative of the base operating set of performance parameters of the exemplar machine and to establish for such target machine, in place of the target machine's previously established base operating set of machine-specific performance parameters, a substitute set of base operating performance parameters generally like the base operating set of performance parameters of the exemplar machine.

Once the substitute set of base operating performance parameters has been established in the target machine, the target machine is then, thereafter, operable to independently perform the particular agricultural operation in accordance with performance parameters that include as at least a subset thereof the substitute base operating set of performance parameters established for the target machine by communication over the wireless bus of the peer-to-peer network of agricultural machines.

In general, the communications control portions of the operating systems of the individual agricultural machines will typically have a baseband control formed of or including firmware and may operate as a host controller for controlling the communication of data representative of a base operating set of performance parameters of an agricultural machine designated as the exemplar machine to one or more agricultural machines designated as target machines. Preferably, each of the agricultural machines, and the communications control portions thereof, will be designed so that such agricultural machine can serve as the machine capable of making such designations and controlling the exchange of data, but, in some instances, it may be desired that the system and individual communications control portions are so designed that a particular agricultural machine is fixed as the controller.

Preferably, the communications control portions will be so designed that intercommunication between and among the plurality of individual agricultural machines forming the peer-to-peer network can be effected in a manner that allows such machines to be designated or recognized as authorized members of the network entitled to participate in the exchange of data over the wireless bus of the network while restricting or preventing access to such data and intercommunication by other machines, such as agricultural machines in adjacent fields or third party systems. Such security can be achieved, at least in part, by the use of or adjustments in or to data protocols utilized, signal encryption, and/or restriction of the distribution range of the wireless signals.

BRIEF DESCRIPTION OF THE DRAWINGS

FIG. 2 is a block diagram of various components associated with an operating system of a piece of agricultural equipment or the like.

DETAILED DESCRIPTION OF THE INVENTION

Figure 1:
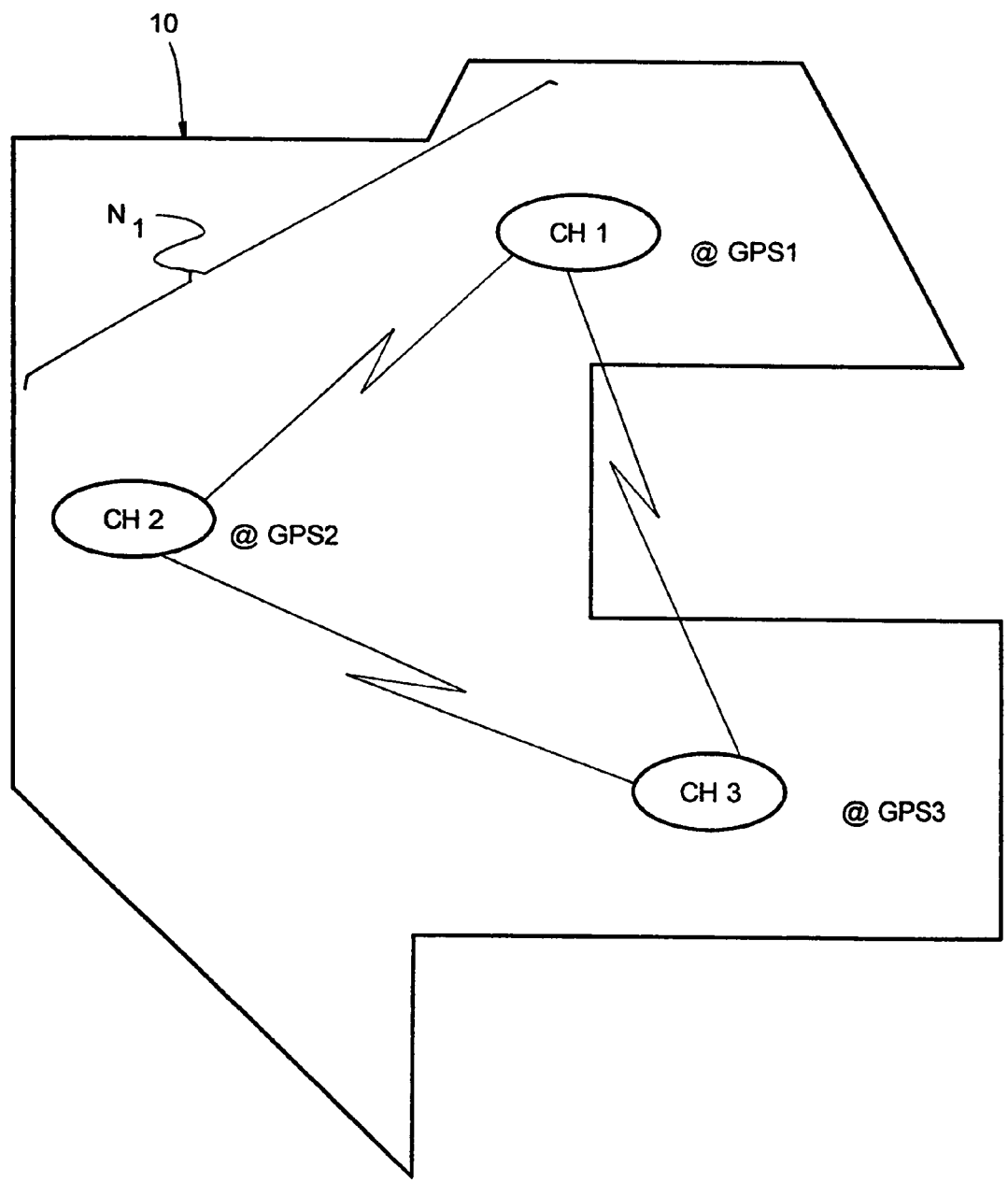
FIG. 1 is a diagram depicting a representative field with a plurality of generally like combine harvesters therein for harvesting the crop in the field, with such harvesters joined with one another in a peer-to-peer network allowing for point-to-point wireless communications therebetween.

Referring now to the drawings, wherein like numbers refer to like items, FIG. 1 depicts a field 10 in which a plurality of like-purpose agricultural machines, such as combine harvesters CH1, CH2, and CH3, are engaged in performing a generally like agricultural operation, such as the harvesting of the particular crop in field 10. As depicted in FIG. 1, combine harvester CH1 is at location GPS1, combine harvester CH2 is at location GPS2, and combine harvester CH3 is at location GPS3.

Figure 2:
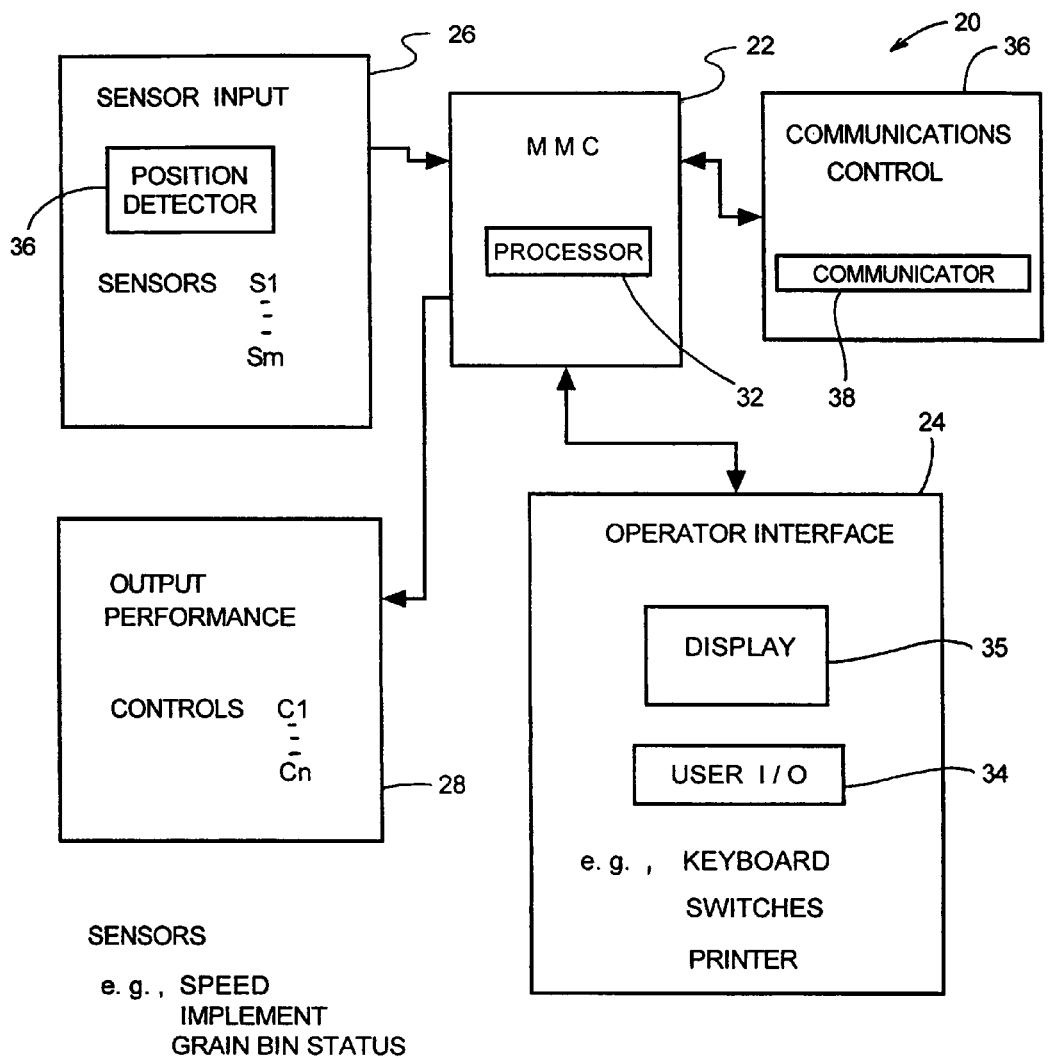

Each of the combine harvesters CH1, CH2, and CH3 includes an operating system 20 such as depicted in FIG. 2, which operating system includes a master machine control (MMC) 22, an operator interface portion 24, a sensor input portion 26, and an output performance portion 28. The MMC 22 typically includes a processor portion 32, often operating under program control, variously sometimes referred to as operating system software or master machine control software or the operating software or program, that is operatively connected to the other noted portions of the operating system 20.

Operator interface portion 24 typically includes a user input/output (I/O) interface 34 that may include, by way of example and not of limitation, a keyboard for the entry of commands or other input, control switches, and printout devices, as well as a display portion 35 that may include, by way of example and not of limitation, a video display, lights, and gauges.

Sensor input portion 26 typically includes a plurality of sensors S1 through Sm connected to monitor various conditions of the combine harvester and of the environment in which the harvester is operating. Such sensor input portion 26 may also include or have associated therewith a position sensing or determination system 36, including known systems for determining the location of the harvester by global positioning, which system 36 may hereinafter sometimes be referred to as a position detector system.

The output performance portion 28 includes various operation controls C1 through Cn for controlling the operations of the harvester. Such controls C1 through Cn may, for example, include equipment and controls for setting or adjusting the harvester's speed, steerage, height of cutting or harvesting implements, distribution of crop residue, and positioning in the field, among numerous other possible actions.

With such an operating system 20, MMC 22 is operable, based at least in part upon data and information received from the operator interface portion 24 and the sensor input portion 26, to control the operation of the agricultural machine through output performance portion 28. Control of output performance portion 28 and of the individual controls C1 through Cn thereof is effected by the establishment by processor portion 32 of various performance parameters and the use of such performance parameters in controlling the individual controls C1 through Cn. When the performance parameters are established based primarily, if not exclusively, upon data made available through the operator interface portion 24 and the sensor input portion 26, the performance parameters are typically considered to be machine-specific performance parameters.

Consequently, when a plurality of combine harvesters are utilized to harvest the crop in a given field, each of the plurality of harvesters may be operating in accordance with the machine-specific performance parameters established for that individual harvester, which machine-specific parameters may vary from harvester to harvester, even if the harvesters are of a common make and model. Certain of the machine-specific parameters may change or be modified based upon inputs received from sensors S1 through Sm as the harvesting operation proceeds, while other performance parameters remain set. Even as to those performance parameters whose values may be changeable over time, if those values remain reliant, to some extent, upon any default or initially set or determined values or any nominal or base values based upon default or initially set or determined values relating to sensors S1 through Sm, such changeable performance parameters will remain heavily dependent upon or influenced by such default or initially set or determined values, as a consequence of which such default or initially set or determined values may often be considered of significance.

In general, at least some of the performance parameters may be considered or deemed to be of greater importance or significance than others of the performance parameters, and users often desire, if a plurality of harvesters are being used to harvest the crop in a given field, that at least certain of the performance parameters be as uniform among the plurality of machines as may be possible, especially when the harvesters being used are of the same or similar makes and models. Effecting such commonality has been problemsome, however, since, typically, the performance parameters have been specific to each of the plurality of harvesters, due in part to the individualities of the operators of such harvesters.

In accordance with the present invention, operating system 20 thus also includes a communications control portion 36, operatively connected to MMC 22, that serves as a gateway for the communication of data between MMC 22 and external sources. As will be addressed in greater detail hereinafter, such communications control portion 36 allows a user to control the wireless transmission of data to or the receipt of data from external sources, including data representative of at least a subset of the performance parameters of a harvester, which subset of performance parameters is hereinafter referred to as the base or core operating set of performance parameters.

In general, when communications control portion 36 of the operating system 20 of a harvester operates, under control of MMC 22, to receive from a different harvester data representative of the base operating set of performance parameters of that different harvester and such representative data is provided to MMC 22, MMC 22 thereafter utilizes such representative data, typically in conjunction with certain other data provided to MMC 22 from operator interface portion 24 and sensor input portion 26, or as included in the performance parameters already previously established for such harvester, to develop and establish substitute or replacement performance parameters for such harvester that will be utilized by that harvester in the further performance of the harvesting operation.

Figure 3:
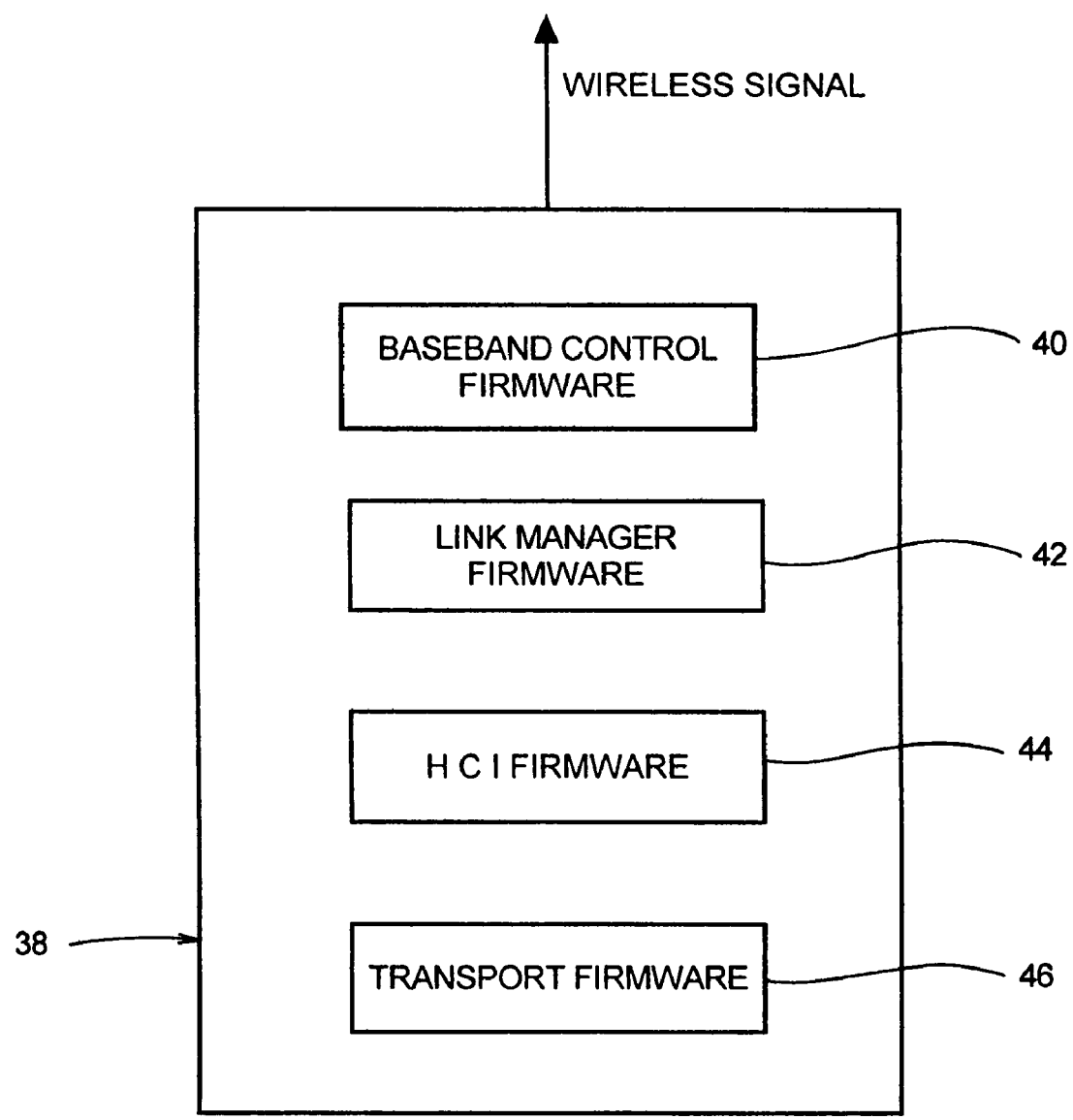
FIG. 3 is a block diagram of a typical communicator module included in the communications control portion of the operating system of a combine harvester configured in accordance with the present invention.

FIG. 3 depicts in schematic or block form a module 38 such as may form or be included within the communications control portion 36. As presented in FIG. 3, module 38, which is hereinafter often referred to as a communicator module, is shown to include a baseband control portion 40, a link manager portion 42, a host controller interface (HCI) portion 44, and a transport portion 46. Typically, such portions include program code installed to permanently reside or be retained within or associated with hardware components, such as to be in read only memory, which program code thus is often considered to constitute firmware, but that need not necessarily be the case. Depending upon the desires of manufacturers and users, such portions may be designed and configured to include hardwired or specialty hardware components, to include hardware with installed firmware, or to include hardware with associated software, all of which configurations may be utilized to the same effect.

In accordance with the present invention, a module such as module 38 is associated with the communications control portion 36 of each agricultural machine that is to be included within the desired network Nz, where z is a reference identification number between 1 and p. Such module 38 is generally operable to transmit and receive short range communications signals, including, but not limited to, signals made available through WiFi and Bluetooth systems, in accordance with the construction details of such module as well as certain protocols and standards, which may be determined by or included within component hardware, firmware, and software, and is preferably configured to provide or employ security features therewith, including forms of signal encryption in various instances, to permit authorized agricultural machines to be joined to a peer-to-peer network while preventing unauthorized agricultural machines from being able to join the network or to communicate with the agricultural machines of such peer-to-peer network through such network.

Figure 4:
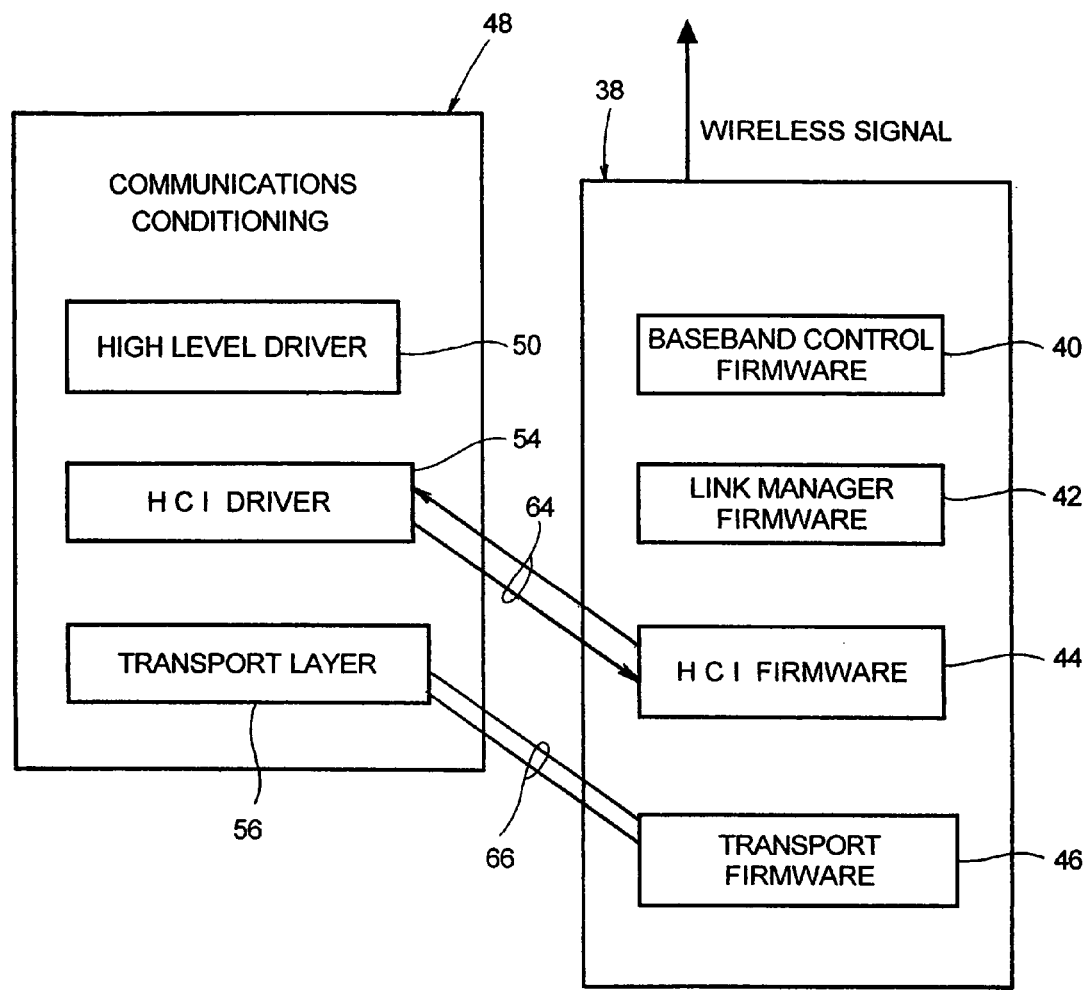
FIG. 4 is a block diagram illustrating the relationship of the communicator module of the communications control portion of FIG. 3 with a communications conditioning module of the master machine control of the operating system.

Typically, each of the plurality of agricultural machines that will be joined to the peer-to-peer network and which is to include and employ a communications control portion 36 that has a module such as communicator module 38 will also include as part of MMC 22 an associated module 48, hereinafter referred to as a communications conditioning module, that functions with communicator module 38 to control the transmission and receipt of data signals by operating system 20. In such regard, as depicted generally in FIG. 4, communications conditioning module 48 of MMC 22 may be considered to include a high level driver portion 50, a host controller interface (HCI) driver portion 54, and a transport layer portion 56. When the communicator module 38 and the communications conditioning module 48 are considered to have such general configurations, data and control interchanges may typically be considered to occur between the HCI driver portion 54 of communications conditioning module 48 and the HCI firmware section 44 of communicator module 38 and between the transport layer portion 56 of communications conditioning module 48 and the transport firmware section 46 of communicator module 38, as denoted by the interchange pairings 64 and 66. Typically, high level driver portion 50 will serve or function as a link or interface between master machine control software such as may be employed with the processor 32 and the more particularized software and firmware employed with the host controller interface driver portions and transport layer portions 54 and 56.

As will be appreciated by those skilled in the art, the communicator and communications conditioning modules 38 and 48 may take many forms and employ firmware and software designed or adapted to operate in conformity with the particular agricultural equipment (AE) with which they are employed and with the operating system software utilized in such agricultural equipment. Depending upon the particular forms of such modules 38 and 48 and the operating systems of the agricultural equipment of which they form a part, greater or lesser functional responsibilities may be distributed between the modules 38 and 48 and their component sections and portions, to the point that, in some instances, most of the firmware and software associated with the wireless communications may be subsumed within operating system hardware and software for the agricultural equipment, principally identified as being included within MMC 22, particularly where the agricultural equipment is provided by a manufacturer with an operating system that integrates to a great degree the hardware and software for the operation of such system, similar to the manner in which many personal computer systems may be provided with modem support integrated onto a motherboard and with related drivers and software included with the operating system software. To greater or lesser degrees, the various other elements depicted in FIG. 2, may also be subsumed into such operating system hardware and software, and in some instances, position detection may involve elements or portions of all of position detector 36 of sensor input portion 26, communications control portion 36, and MMC 22, especially when position detection makes use of global positioning signals.

In any event, the communications control portion 36 of operating system 20 is considered to be operable under control of MMC 22 to control the wireless signals transmitted and received by the agricultural equipment of which it forms a part. With particular regard to the present invention, MMC 22 and communications control portion 36 of operating system 20 of a particular harvester such as harvester CH1 are designed and configured and operate to be able to operatively identify other harvesters, such as harvesters CH2 and CH3, which are authorized to participate in a peer-to-peer network Nz with harvester CH1, labeled in FIG. 1 as network N1, and to operatively connect to such harvesters on a point-to-point basis. The MMCs 22 and communications control portions 36 of harvesters CH2 and CH3 are similarly operable to establish such point-to-point connectivity with harvester CH1 and one another. Such identification of authorized harvesters may utilize various name resolution and network graphing and security technologies in order to ensure that only authorized harvesters are recognized as participants in the peer-to-peer network and that non-joined agricultural equipment will be excluded from participation.

In general, each harvester entitled to participate in a given secure network or group, which may be identified by a unique group name, may be required to have an identity, a unique peer name, herein represented by network labels N1, N2, and so on, and credentials that prove the ownership of such participant's identity. Oftentimes, such participants may be referred to as group members and will have credentials to prove that they are a recognized member of a particular group.

Depending upon field size and conditions, several differentiable networks having different group members could be established within different portions of a field, and some harvesters could be group members of several networks or groups, as will be further addressed hereinafter.

When a plurality of harvesters are positioned in a field, such as at positions as shown in FIG. 1, the operators of such harvesters may initiate actions to identify and join in a peer-to-peer network N1 other harvesters within range of the short distance communications signals of such harvesters. With a network N1 so established, the operator of a harvester, such as harvester CH3, may then transmit to the group members of such network N1 information from its operating system 20 identifying such harvester, or perhaps some other harvester, such as harvester CH2, as the expert or exemplar harvester for the continued performance of a harvesting operation. Depending upon overall system design and operation, such transmission may, but need not necessarily, require acceptance acknowledgements by the other group members before recognition of the designated harvester as the exemplar.

At the instigation of an operator of a harvester, data representative of the base operating set of performance parameters of the exemplar can then be caused to be transmitted by the exemplar to one or more designated target harvesters among the group members. Upon receipt of data transmitted from the exemplar, the MMC 22 of the target harvester will operate to establish for such target harvester a replacement set of performance parameters based, at least in part, upon such received data, the base operating set of which replacement set of performance parameters will be generally the same as or similar to or will correspond to the base operating set of performance parameters of the exemplar.

It should be appreciated that, when the harvesters that are group members are of the same make and model, the replacement base operating set established for a target harvester will typically be generally the same or highly similar to the base operating set of the exemplar. As models, and particularly as makes, of harvesters vary among the group members, allowances may be required to be made to adapt the base operating set of performance parameters for the exemplar to a corresponding replacement base operating set of performance parameters for a target harvester of a different make or model than that of the exemplar. In such regard, adaptation or conversion charts, tables, algorithms, or techniques may be employed by or with the MMC 22 to develop the replacement base operating sets for the target harvesters.

Preferably, when a replacement base operating set of performance parameters is established in a target harvester, such harvester will transmit to at least the harvester which had instigated such replacement action, if not to other group members as well, an indication that such replacement activity has occurred. If, for some reason, such replacement operation could not be effected, an indication of such failure will similarly be preferably transmitted.

Once a replacement base operating set of performance parameters has been established in a target harvester, further harvesting operations can then be effected by the target machine based upon and generally closely conforming to the harvesting operations being performed by the exemplar.

Figure 5:
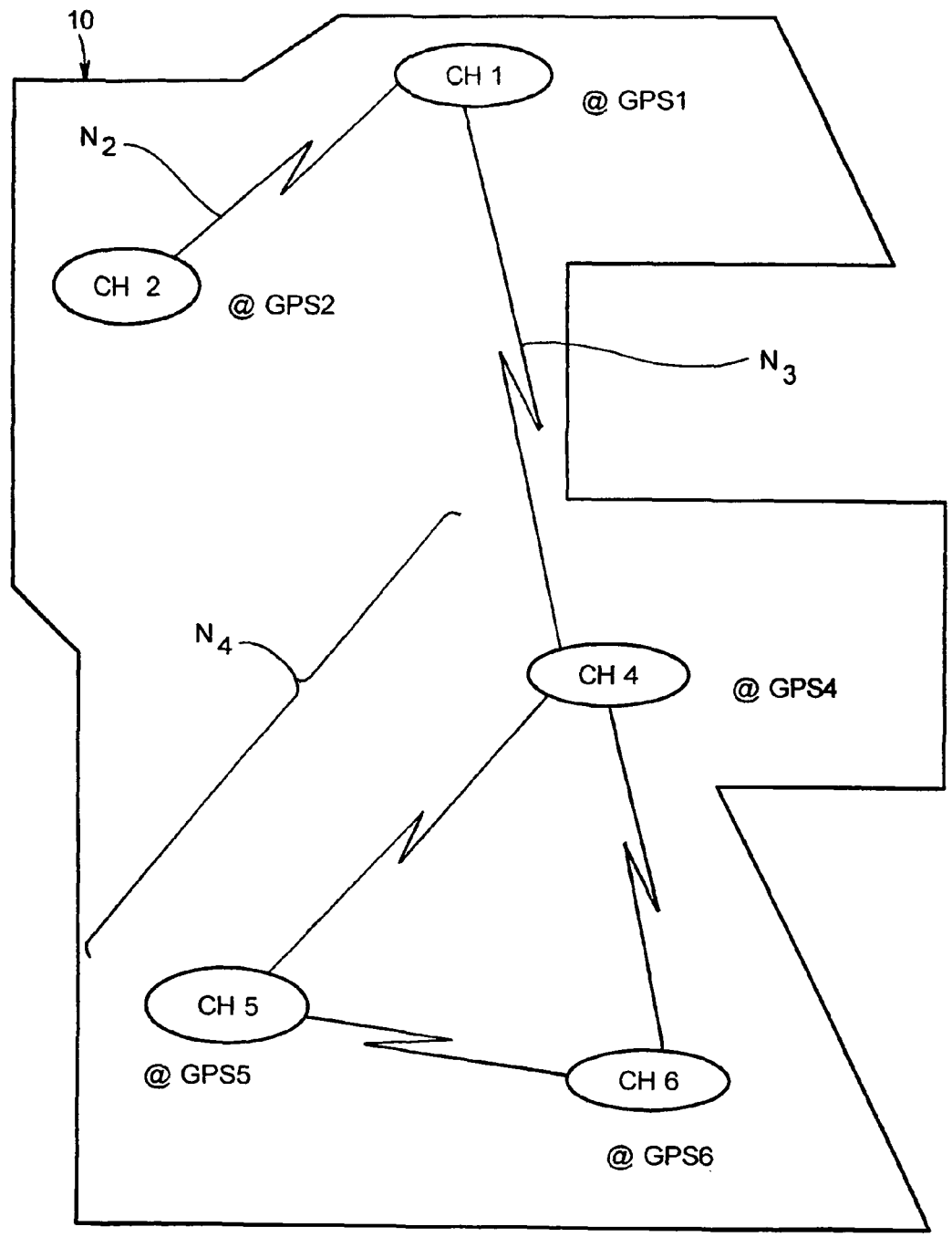
FIG. 5 is a diagram somewhat similar to FIG. 1, but depicting a larger field with a greater plurality of generally like combine harvesters therein for harvesting the crop in the field, wherein the harvesters are so positioned and wirelessly interconnected to form several peer-to-peer networks, with the harvesters of each network being in point-to-point wireless communications with other harvesters of such same network, and wherein one of the harvesters is a member of two distinct networks.

Depending upon field size and topographical conditions, it may sometimes be the case that one or more harvesters may be so distant from the exemplar that point-to-point communications cannot be established between all the harvesters due to the limited range of the short distance communications signals being transmitted by such harvesters. FIG. 5 depicts such a situation wherein harvester CH1 is within range of harvesters CH2 and CH4, but is not within range of harvesters CH5 and CH6. Harvester CH2 is shown to be within range of only harvester CH1 and out of range with all of harvesters CH4, CH5, and CH6. Harvesters CH4, CH5, and CH6 are within range of one another, but, of such harvesters, only harvester CH4 is within range of harvester CH1. Under such circumstances, a point-to-point network N2 can be established between harvesters CH1 and CH2, a different point-to-point network N3 can be established between harvesters CH1 and CH4, and a still further point-to-point network N4 can be established between and among harvesters CH4, CH5, and CH6.

If harvester CH1 is identified as the exemplar whose base operating set is to be adopted or emulated by the other harvesters in the field, data representative of the exemplar base operating set can be transmitted on a peer-to-peer basis from harvester CH1 to harvester CH2 in point-to-point network N2, from harvester CH1 to harvester CH4 in point-to-point network N3, and, in a relayed transmission, from harvester CH4 to harvesters CH5 and CH6 in point-to-point network N4. Depending upon the designs and configurations of the MMCs 22 and communications control portions 36 of such harvesters, harvester CH4 may need to be designated as the exemplar for network N4, although instruction and message control instructions for the MMCs 22 and communications control portions 36 may also provide for the acceptability of relayed transmissions without such a designation.

From the foregoing, it will be appreciated that information and data representative or indicative of various criteria and values can be transmitted in short distance communication signals on point-to-point bases between various authorized pieces of agricultural equipment assembled in a field and that such transmitted information and data can be advantageously utilized by authorized agricultural equipment receiving such data and information to establish peer-to-peer networks among the authorized agricultural equipment and to exchange information and data therebetween and to use such data and information to establish general uniform performance parameters among such agricultural equipment based upon performance parameters of a designated exemplar. By way of example and not of limitation, among the information and data whose transmission and exchange is preferably considered desirable in many instances would be information identifying the type, make, and model of the agricultural equipment as well as an equipment identification and/or operator designated label. In some instances and with some systems, information identifying the individual operator may also be desirable. Information as to vehicle setting status is also considered desirable, as would be feedrate control status, desired fan speed, desired ground speed or feedrate control setting, desired concave setting, desired upper sieve setting, desired lower sieve setting, and desired straw setting, which information is but a sampling of the information and data that that can be advantageously exchanged and utilized in accordance with the present invention.

Although the foregoing discussion has generally focused on the harvesters that are joined together to form a peer-to-peer network Nz in point-to-point communication with one another, it should be recognized that such network Nz may also permit the joinder and inclusion of other group members which need not be harvesters, such as an overseer, who may be in a different piece of agricultural or equipment or even at a land-based site within point-to-point range. In such event, the overseer could be the group member of the network that designates the exemplar and the target machines.

Additionally, it should be appreciated and understood that the communications control portions 36 of the operating systems 20 may be designed and configured to have or to operate in accordance with various technologies and standards, including, but not limited to, GPRS/GSM, Bluetooth, WiFi (IEEE 802.11 standard), WiMAX (IEEE 802.16 standard), satellite, and ZigBee, to name but a few, but is not limited to any technology or standard, so long as the technology and standards permit or provide for point-to-point communications between the group members of the network Nz over a short range. Depending upon the technology and standards employed, as well as the particular hardware/firmware/software components, adjustments to the broadcast range of the signals may also be made available to users of the equipment. Such range adjustment or limitation, especially if coupled with various network security features, which may include various encryption techniques as well as signal hopping technologies, can be advantageously utilized to better secure the established network Nz of like-purpose agricultural machines against unauthorized intrusions or the distribution of information or data to unauthorized machines or personnel.

Furthermore, in some systems the communications control portion 36 may be designed to have or make use of different user levels for read/write and data exchange privileges, which user levels may be based upon or related to the skill level of individual machine operators or users. For example, users may be designated or identified as belonging to one of several different categories, such as Administrator, Expert, Intermediate, Novice, or Standard, with each category entitled to different privileges. With such categorization, the Administrator user may have all read/write privileges and be entitled to modify network/communication settings; the Expert user may have all read/write privileges; the Intermediate user may have limited write privileges, but full read privileges; the Novice user may have no write privileges, but full read privileges; and the Standard user may have no read/write privileges.

Especially with such systems and their communications control portions, certain users might then be able to query other vehicles to view the operating parameters of that other vehicle. For example, an Expert user could, based upon broadcast performance parameters, remotely tune the machine settings of another vehicle in the field and a Novice user could query other vehicles in the field to learn how to better tune his machine.

While the foregoing discussion has addressed the distribution of performance parameters from an exemplar combine harvester to other combine harvesters in a field, it should be appreciated that the invention can also be employed with other types of like-purpose agricultural equipment that are operating in a field to perform a particular agricultural operation. In such regard, those skilled in the art will thus recognize that the present invention can be used to like or similar effect with various other types of harvesters, such as cane harvesters, grape harvesters, forage harvesters, cotton harvesters, as well as with sprayers, floaters/spreaders, tractors with an air seeder or planter, and chase vehicles, including tractors with grain carts for combines, to name but a few of the myriad types of agricultural equipment.

In light of all the foregoing, it should thus be apparent to those skilled in the art that there has been shown and described a system and method employing short range communications for establishing performance parameters of an exemplar agricultural machine among a plurality of like-purpose agricultural machines. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A system for enabling the establishment of performance parameters for and among a plurality of agricultural machines designed and operable to perform agricultural operation in accordance with an operating set of performance parameters established for such agricultural machine, comprising:

a plurality of agricultural machines located within a given area, each of which individual agricultural machines includes an operating system that includes an operator interface portion, a sensor input portion, a master machine control portion, and an operation performance portion, said master machine control portion operatively connected to said operator interface portion, said sensor input portion, and said operation performance portion, said operator interface portion including operator input controls operable to provide operator input data to said master machine control portion, said sensor input portion operable to monitor operational conditions and to provide sensor input data to said master machine control portion, said output performance portion operable to effect performance of an agricultural operation by such individual agricultural machine under control of said master machine control portion thereof, said master machine control portion responsive to said data provided thereto from said operator interface portion and said sensor portion to establish performance parameters for said individual agricultural machine, each said individual agricultural machine operable to establish machine-specific performance parameters for such agricultural machine and to independently perform the agricultural operation in accordance with said machine-specific performance parameters established therefor, said machine-specific performance parameters including as at least a subset thereof a set of performance parameters defining a base operating set of performance parameters, each said individual agricultural machine also having associated therewith a communications control portion operable to transmit and receive communication signals, said communications control portion operatively connected to said master machine control portion to effect the communication therefrom and thereto of communications data, said plurality of individual agricultural machines being positioned with respect to one another to be within range of said communication signals, said positioned plurality of individual agricultural machines defining and being group members in a peer-to-peer network having a wireless communications bus accessible through said communications control portions of said individual agricultural machines interconnecting said positioned plurality of individual agricultural machines for point-to-point communications, a group member of said peer-to-peer network being operable to enable said group member to identify an exemplar machine from said plurality of individual agricultural machines and to effect the transmission by said exemplar machine of data representative of said operating set of performance parameters of said exemplar machine over said wireless communications bus to others of said plurality of agricultural machines, at least one of said plurality of agricultural machines, defined as a target machine, operable to receive over said wireless communications bus said data representative of said base operating set of performance parameters of said exemplar machine and to establish for said target machine, in place of said target machine's previously established base operating set of machine-specific performance parameters, a substitute base operating set of performance parameters determined from said base operating set of performance parameters established for said exemplar machine, said target machine thereafter operable to independently perform the agricultural operation in accordance with said substitute base operating set of performance parameters established therefor.

2. The system of claim 1 wherein said group member of said peer-to-peer network that is operable to enable said group member to identify an exemplar machine from said plurality of individual agricultural machines and said operator interface portion thereof is operable to enable the operator thereof to identify said exemplar machine.

3. The system of claim 2 wherein said data representative of said exemplar machine's base operating set is representative of a select portion of the machine-specific performance parameters established for said exemplar machine.

4. The system of claim 2 wherein said base operating set of performance parameters replaced in said target machine is a machine-specific set of performance parameters established for said target machine.

5. The system of claim 1 wherein said peer-to-peer network includes at least one group member that is as an overseer, said overseer being the group member operable to enable said group member to identify an agricultural machine of said plurality of individual agricultural machines as an exemplar machine.

6. The system of claim 1 wherein
said master machine control includes a processor and a control program therefor, and
said operating system includes, associated with and distributed among said master machine control portion and said communications control portion, a communicator module and a communications conditioning module,
said communicator module operable to control the transmission and reception of wireless communications signals by said communications control portion,
said communications conditioning module operable to condition and link control and data signals provided from said master machine control portion of said operating system to said communicator portion of said communications control portion and to link and decipher control and data signals received by said master machine control portion from said communicator portion.

7. The system of claim 6 wherein said communicator portion of said communications control portion includes a baseband control portion, a link manager portion, a host controller interface portion, and a transport portion.

8. The system of claim 7 wherein said communications conditioning module includes a transport layer associatable with the transport portion of said communicator portion, a host controller interface driver portion associatable with the host controller interface portion of said communicator portion, and a driver portion that serves as a link between the control program for said processor and said host controller interface driver portion and said transport layer portion.

9. The system of claim 8 wherein said communications control portion includes said communicator module and said master machine control portion includes said communications conditioning module.

10. The system of claim 6 wherein said communications signals are encrypted signals.

11. The system of claim 6 wherein said communications control portion is configurable by a user to limit the broadcast range of said communications signals.

12. The system of claim 6 wherein, for an individual machine to be accepted as a group member of said peer-to-peer network, such individual machine must be recognized as an agricultural machine authorized to be a group member.

13. The system of claim 1 wherein said group members of the peer-to-peer network are required to have electronic credentials recognizable by the other group members to be accepted as group members of said network.

14. The system of claim 13 wherein said communications signals are formed and transmitted by said communications control portions of said operating systems in accordance with a given protocol and said group members of said peer-to-peer network are operable to be able to recognize and decipher communications signals received thereby.

15. The system of claim 1
wherein said plurality of agricultural machines defines a first subset of agricultural machines having features and capabilities, and
wherein said system also includes a second subset of agricultural machines having at least one feature or capability different from features and capabilities of said first subset,
wherein said data representative of said base operating set of performance parameters of said exemplar machine includes exemplar identification information indicative of the subset of agricultural machines to which said exemplar machine belongs,
wherein said target machine belongs to a different subset of agricultural machines than said exemplar machine, and
wherein said operating system of said target machine is responsive to receipt of said exemplar information to be able to convert said base operating set of performance parameters for the exemplar machine to a comparable, substitute base operating set of performance parameters for said target machine.

16. The system of claim 15 wherein said operating systems of said agricultural machines include stored conversion tables utilizable thereby for converting said base operating set of performance parameters for an exemplar machine to a base operating set of performance parameters for a target machine.

17. The system of claim 1
wherein said agricultural machines constitute a first set of agricultural machines,
wherein said peer-to-peer network of which said first set of agricultural machines are group members constitutes a first group network, and
wherein said system further includes a second set of agricultural machines,
the individual agricultural machines of said first and second sets being agricultural machines,
the individual agricultural machines of said second set including operating systems,
said individual machines of said second set of agricultural machines being positioned with respect to one another to be within range of said communications signals of said second set,
said positioned individual machines of said second set of agricultural machines defining and being group members in a second group network, said second group network being a peer-to-peer network having a wireless bus accessible through said communications control portions of said individual agricultural machines of said second set interconnecting said positioned individual agricultural machines of said second set for point-to-point communications,
said group members of said second network group being operable within said second network group,
at least one group member of said first network group also being a group member of said second network group, such group member defined as a common group member,
said common group member operable to receive communications signals as a group member of said first network group and to relay said received communications signals to group members of said second network group.

18. The system of claim 17 wherein said common group member is a target machine in said first network group.

19. The system of claim 18 wherein said common group member, upon replacement of its previously established base operating set of performance parameters with a substitute base operating set of performance parameters, is identified as the exemplar machine of said second network group.

20. A method for establishing performance parameters for and among a plurality of agricultural machines each of which is designed and operable to perform an agricultural operation in accordance with an operating set of performance parameters established for such agricultural machine, comprising
providing a plurality of individual agricultural machines, each of which individual agricultural machines includes an operating system that includes an operator interface portion, a sensor input portion, a master machine control portion, and an operation performance portion,
said master machine control portion operatively connected to said operator interface portion, said sensor input portion, and said operation performance portion,
said operator interface portion including operator input controls operable to provide operator input data to said master machine control portion,
said sensor input portion operable to monitor operational conditions and to provide sensor input data to said master machine control portion,
said output performance portion operable to effect performance of a agricultural operation by such individual agricultural machine under control of said master machine control portion thereof,
said master machine control portion responsive to said data provided thereto from said operator interface portion and said sensor portion to establish performance parameters for said individual agricultural machine,
each said individual agricultural machine operable to establish machine-specific performance parameters for such agricultural machine and to independently perform the agricultural operation in accordance with said machine-specific performance parameters established therefor, said machine-specific performance parameters including as at least a subset thereof a set of performance parameters defining a base operating set of performance parameters,
each said individual agricultural machine also having associated therewith a communications control portion operable to transmit and receive communication signals, said communications control portion operatively connected to said master machine control portion to effect the communication therefrom and thereto of communications data,
each said individual agricultural machine being positionable relative to said other individual agricultural machines in the plurality of agricultural machines to be within range of said communication signals and, with said other individual agricultural machines, to define a peer-to-peer network having a wireless communications bus accessible through said communications control portions of said individual agricultural machines interconnecting said positioned plurality of individual agricultural machines for point-to-point communications when so positioned and to be a group member of said peer-to-peer network, wherein
a group member of said peer-to-peer network is operable to enable said group member to identify one agricultural machine of said plurality of individual agricultural machines as an exemplar machine and to effect the transmission by said exemplar machine of data representative of said operating set of performance parameters of said exemplar machine over said wireless communications bus to others of said plurality of agricultural machines, and
at least one of said plurality of agricultural machines, defined as a target machine, is operable to receive over said wireless communications bus said data representative of said base operating set of performance parameters of said exemplar machine and to establish for said target machine, in place of said target machine's previously established base operating set of machine-specific performance parameters, a substitute base operating set of performance parameters generally determined from said base operating set of performance parameters established for said exemplar machine,
positioning said plurality of individual agricultural machines with respect to one another within the field to be within range of said communication signals,
effecting the establishment of a peer-to-peer network including said plurality of positioned individual agricultural machines as group members thereof, said peer-to-peer network having a wireless communications bus accessible through said communications control portions of said individual agricultural machines interconnecting said positioned plurality of individual agricultural machines for point-to-point communications, operating a group member of said peer-to-peer network to effect a distribution of data representative of said base operating set of performance parameters of an exemplar machine to others of said plurality of individual agricultural machines, including operating said group member to identify an agricultural machine of said plurality of individual agricultural machines as an exemplar machine and to effect the transmission by said exemplar machine of data representative of said operating set of performance parameters of said exemplar machine over said wireless communications bus to others of said plurality of agricultural machines, the receipt by a target machine of said data representative of said operating set of performance parameters of said exemplar machine transmitted over said wireless communications bus to establish for said target machine said operating set of performance parameters of said exemplar machine as a substitute base operating set of performance parameters for said target machine, and the subsequent operability of said target machine in accordance with said substitute base operating set of performance parameters, whereby said base operating set of performance parameters of said exemplar machine is distributable over said wireless communications bus of said peer-to-peer network to each target machine to thereafter be usable by said target machines to be independently operable in accordance with said substitute base operating sets of performance parameters established therefor to perform the agricultural operation.

21. The method of claim 20 wherein said group member operated to identify an agricultural machine as said exemplar machine is one of said plurality of individual agricultural machines and said operator interface portion thereof is operable to enable the operator thereof to identify said exemplar machine.

22. The method of claim 21 including operating a target machine to provide over said wireless communications bus of said peer-to-peer network an acknowledgement of the establishment of a substitute base operating set of performance parameters for such target machine.

23. The method of claim 20 wherein said master machine control includes a processor and a control program therefor, said operating system includes, associated with and distributed among said master machine control portion and said communications control portion, a communicator module and a communications conditioning module, said communicator module is operable to control the transmission and reception of wireless communications signals by said communications control portion, said communications conditioning module is operable to condition and link control and data signals provided from said master machine control portion of said operating system to said communicator portion of said communications control portion and to link and decipher control and data signals received by said master machine control portion from said communicator portion, and said operation of said group member to effect a distribution of data representative of said base operating set of performance parameters of an exemplar machine to others of said plurality of individual agricultural machines includes the operations of said communications conditioning and communicator modules to format and decipher the wireless signals on said wireless communications bus of said peer-to-peer network.

24. The method of claim 20 wherein said plurality of agricultural machines provided constitutes a first set of agricultural machines and said peer-to-peer network established to include said first set of agricultural machines as group members constitutes a first group network, further including the steps of providing a second set of agricultural machines wherein said individual machines of said second set of agricultural machines are positionable with respect to one another to be within range of said communications signals of said second set, and, with said other individual agricultural machines of said second set, to define a second peer-to-peer network having a wireless communications bus accessible through said communications control portions of said second set of individual agricultural machines interconnecting said positioned plurality of individual agricultural of said second set of agricultural machines for point-to-point communication when so positioned and to be a group member of said second peer-to-peer network, positioning said plurality of individual agricultural machines of said second set with respect to one another within the field to be within range of said communications signals transmitted thereby, said positioned individual machines of said second set of agricultural machines thus defining and being group members in a second group network, said second group network being a peer-to-peer network having a wireless bus accessible through said communications control portions of said individual agricultural machines of said second set interconnecting said positioned individual agricultural machines of said second set for point-to-point communications, said group members of said second network group being operable within said second network group like group members of said first network group within said first network group, positioning at least one group member of said second network group to also be a group member of said first network group, such group member defined as a common group member, said common group member operable to receive communications signals as a group member of said first network group and to relay said received communications signals to group members of said second network group.

25. The method of claim 24 wherein said operation of said group member of said first set of agricultural machines to effect a distribution of data representative of said base operating set of performance parameters of an exemplar machine to others of said plurality of individual agricultural machines includes operation of said common group member to relay to group members of said second network group wireless signals transmitted over said wireless communications bus of said first group network.

* * * * *